United States Patent [19]

Matsui

[11] Patent Number: 5,777,448
[45] Date of Patent: Jul. 7, 1998

[54] CIRCUIT FOR CONTROLLING BRUSHLESS DC MOTOR

[75] Inventor: Nobuo Matsui, Kanagawa-ken, Japan

[73] Assignee: Kabushiki Kaisha Toshiba, Kawasaki, Japan

[21] Appl. No.: 702,121

[22] Filed: Aug. 23, 1996

Related U.S. Application Data

[63] Continuation of Ser. No. 208,583, Mar. 11, 1994, abandoned.

[30] Foreign Application Priority Data

Mar. 31, 1993 [JP] Japan ................... 5-074719

[51] Int. Cl.$^6$ ........................................ H01R 39/46
[52] U.S. Cl. .......................... 318/439; 318/560; 318/569; 318/138; 318/254; 361/23; 361/139; 364/483; 364/550
[58] Field of Search ................... 318/560, 567, 318/569, 600, 439, 254, 139, 138; 361/23, 139; 364/483, 550, 270, 424.1

[56] References Cited

U.S. PATENT DOCUMENTS

| | | | |
|---|---|---|---|
| 4,561,055 | 12/1985 | McKee | 364/424.1 |
| 4,642,542 | 2/1987 | McKeand | 318/560 |
| 4,751,653 | 6/1988 | Junk et al. | 364/484 |
| 4,942,516 | 7/1990 | Hyatt | 364/424.1 X |
| 5,034,674 | 7/1991 | Sato | 318/254 |
| 5,162,716 | 11/1992 | Kyura et al. | 318/569 |
| 5,216,352 | 6/1993 | Studtmann et al. | 361/139 |
| 5,304,903 | 4/1994 | Nakai et al. | 318/254 |
| 5,334,917 | 8/1994 | Lind | 318/254 |
| 5,345,156 | 9/1994 | Moreira | 318/254 |
| 5,390,068 | 2/1995 | Schultz et al. | 361/23 |

*Primary Examiner*—Karen Masih
*Attorney, Agent, or Firm*—Foley & Lardner

[57] ABSTRACT

A circuit controls a brushless DC motor having a magnetic rotor and a stator coil. The circuit has a switching element for switching a current to the stator coil to rotate the rotor. The circuit compares a voltage induced in the motor with a neutral voltage of a DC power source with no delay to provide a positional detection signal. The circuit has a one-chip microcomputer for examining a PWM waveform signal used to generate a synchronous signal and the switching timing of the switching element. The microcomputer samples the positional detection signal only during intervals in which a current is supplied to the stator coil, and carries out other processes during intervals in which no current is supplied to the stator coil.

7 Claims, 5 Drawing Sheets

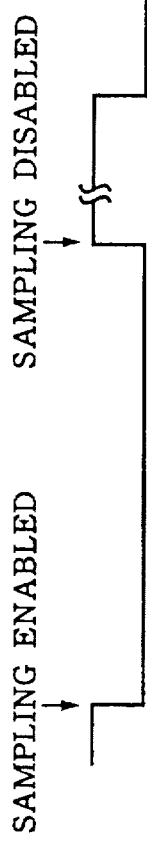
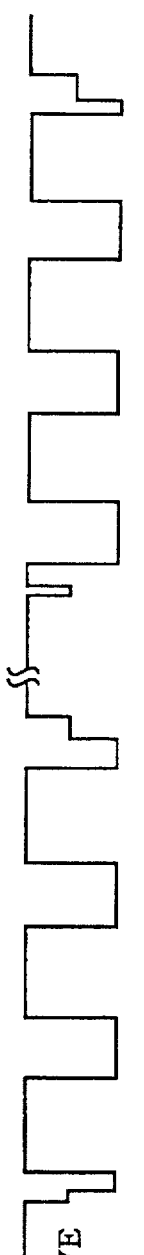
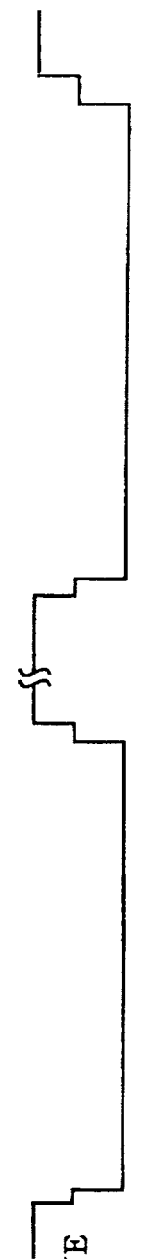
FIG. 5A
FIG. 5B
FIG. 5C
PRESENT INVENTION
FIG. 5D
PRIOR ART

CIRCUIT FOR CONTROLLING BRUSHLESS DC MOTOR

This application is a continuation of application Ser. No. 08/208,583, filed Mar. 11, 1994, now abandoned.

BACKGROUND OF THE INVENTION

1. Field of the Invention

The present invention relates to a control circuit employing a microcomputer to control a brushless DC motor, and particularly, to enabling the microcomputer to execute other processes during a current OFF interval of the motor.

2. Description of the Prior Art

A brushless DC motor employs a magnetic rotor and a stator coil. A current flowing to the stator coil is switched by a switching element to rotate the rotor. The timing of switching the current must be accurately controlled, or an induced voltage will damage the switching element.

FIG. 1 shows a circuit for controlling a brushless DC motor 20 according to prior art. This circuit employs a one-chip microcomputer 11. The microcomputer 11 incorporates a waveform synthesizer, which provides a PWM signal. The PWM signal is passed through diodes 12, 13, and 14, and a resistor 15, to generate a synchronous signal. The synchronous signal is delayed by diodes 16 and 17, resistors 18 and 19, and a capacitor 23. The PWM synchronous signal enables low-level data during a current ON interval to supply a current to the motor 20 and disables high-level data during a current OFF interval to stop the current. The microcomputer 11 controls a drive circuit 21 to drive the motor 20. The position of the motor 20 is detected by a position detector 22, which provides a positional detection signal sampled by the microcomputer 11.

According to this prior art, the microcomputer 11 samples the positional detection signal even during the current OFF interval and processes no other signals during the interval. The sampling period is very long while the OFF motor is running at low speed, and during this period, the microcomputer 11 processes only motor control signals and no other signals. It is necessary, therefore, to provide an external circuit to process other signals, or to avoid the simultaneous processing of these signals. This results in lowering the performance of the circuit.

The resistors and capacitors used to delay the PWM signal involve time constants that are difficult to adjust, and therefore, fluctuate and destabilize the control circuit.

SUMMARY OF THE INVENTION

An object of the present invention is to provide a circuit for controlling a brushless DC motor, the circuit sampling a motor position indicating signal only during a current ON interval and carrying out other processes during a current OFF interval.

In order to accomplish the object, the present invention provides a circuit for controlling a brushless DC motor having a magnetic rotor and a stator coil, and having a switching element for switching a current to the stator coil to rotate the rotor and comparing a voltage induced in the motor with a neutral voltage of a DC power source with no delay to provide a positional detection signal, and comprising: control means for examining a PWM waveform signal used to generate a synchronous signal and switching timing for the switching element, for sampling the positional detection signal during intervals in which a current is supplied to the stator coil, and carrying out other processes during intervals in which no current is supplied to the stator coil.

Other objects, features and advantages of the present invention will be more apparent from the following detailed description of preferred embodiments in conjunction with the accompanying drawings.

BRIEF DESCRIPTION OF THE DRAWINGS

FIGS. 5A–5D are charts showing a comparison between the present invention and the prior art.

DETAILED DESCRIPTION OF THE EMBODIMENTS

Figure 1:
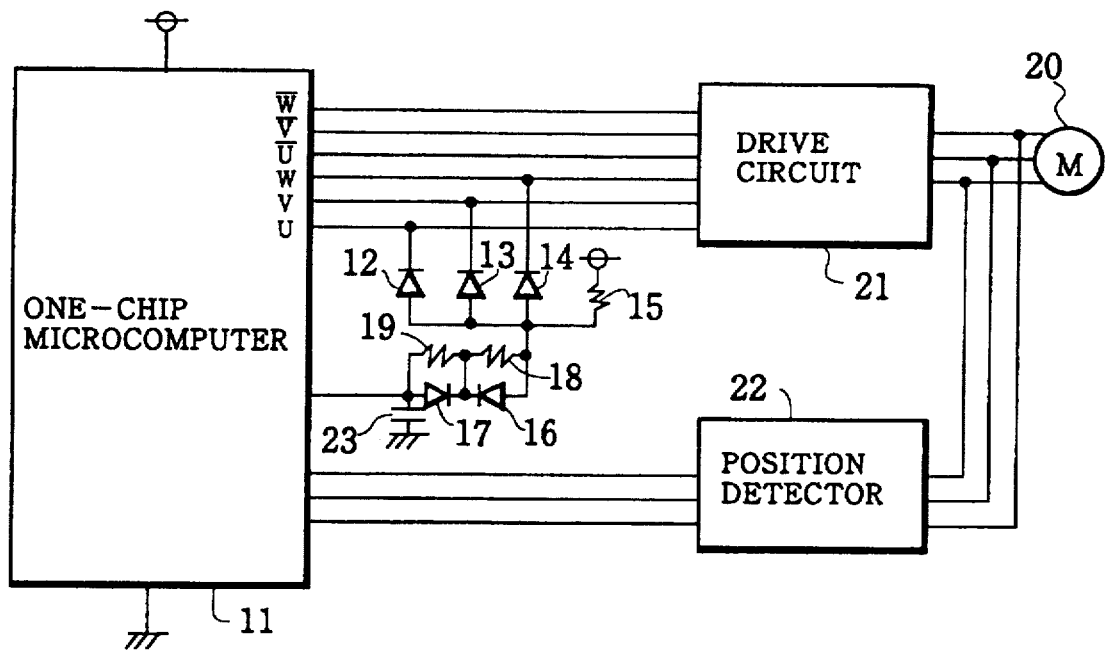
FIG. 1 shows a circuit for controlling brushless DC motor according to a prior art.
Figure 2:
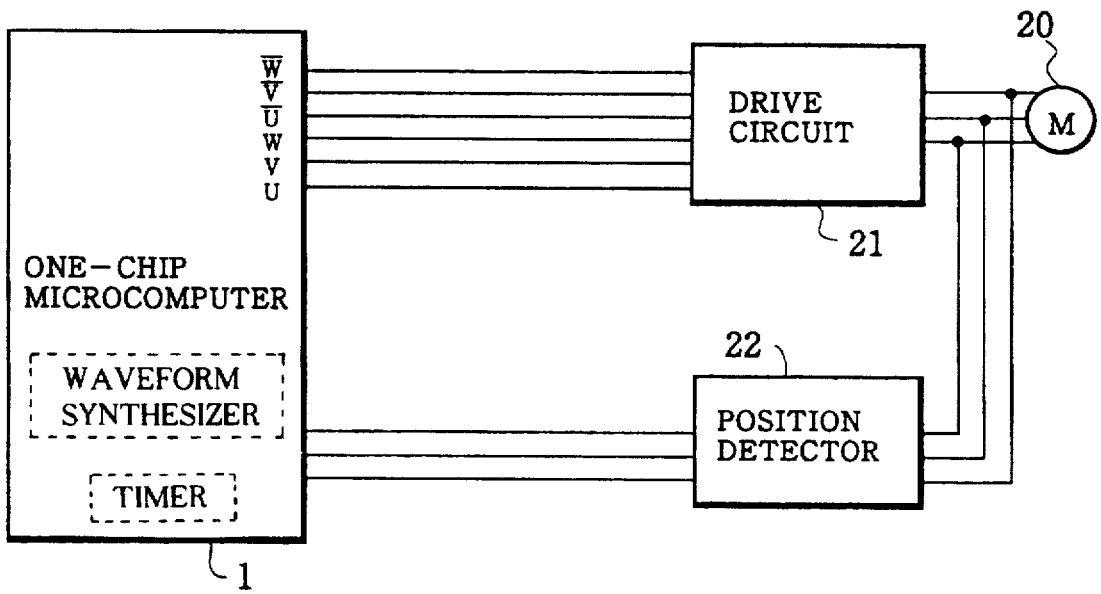
FIG. 2 shows a circuit for controlling a brushless DC motor according to an embodiment of the present invention.

FIG. 2 shows a circuit for controlling a brushless DC motor 20 according to an embodiment of the present invention. This circuit employs a microcomputer 1 that controls a drive circuit 21 to drive the motor 20. The position of the motor 20 is detected by a position detector 22, which provides a positional detection signal to the microcomputer 1.

The microcomputer 1 incorporates a waveform synthesizer to provide a PWM signal. The synthesizer issues an interrupt request to the microcomputer 1 when reloading a WG reload register (not shown) at the start of a current ON interval.

Figure 3:
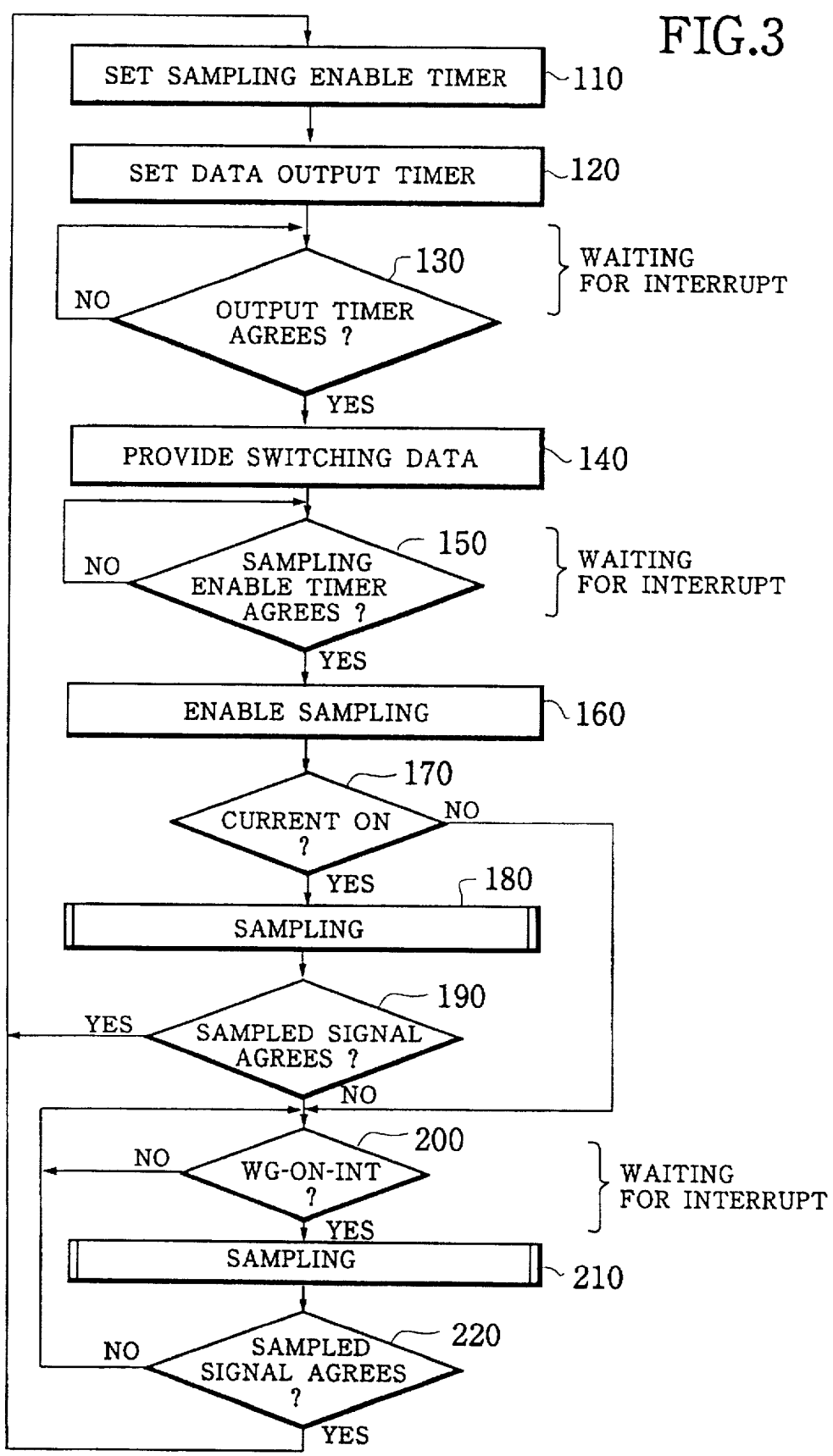
FIG. 3 is a flowchart showing operations of the control circuit of FIG. 2.

FIG. 3 shows steps carried out by the microcomputer 1 to control the motor 20.

Step 110 sets a sampling enable timer, and step 120 sets a data output timer (both being set by TIMER 24 of FIG. 2). Step 130 determines whether or not the data output timer has reached a predetermined time. If YES, step 140 provide's switching data.

Step 150 determines whether or not the sampling enable timer has reached a predetermined time. If YES, step 160 enables a sampling operation (WG ON INT). Step 170 determines whether or not it is in a current ON interval. If YES, step 180 samples the positional detection signal, and if NO, the flow Jumps to step 200.

Step 190 determines whether or not the signal sampled in the step 180 agrees with a predetermined signal. If YES, the flow returns to the first step 110, and if NO, the flow goes to the step 200.

The step 200 determines whether or not the sampling operation is enabled (WG ON INT). If YES, step 210 samples the positional detection signal. Step 220 determines whether or not the sampled signal agrees with a predetermined signal. If NO, the flow returns to the step 200, and if YES; the flow returns to the first step 110.

Figure 4:
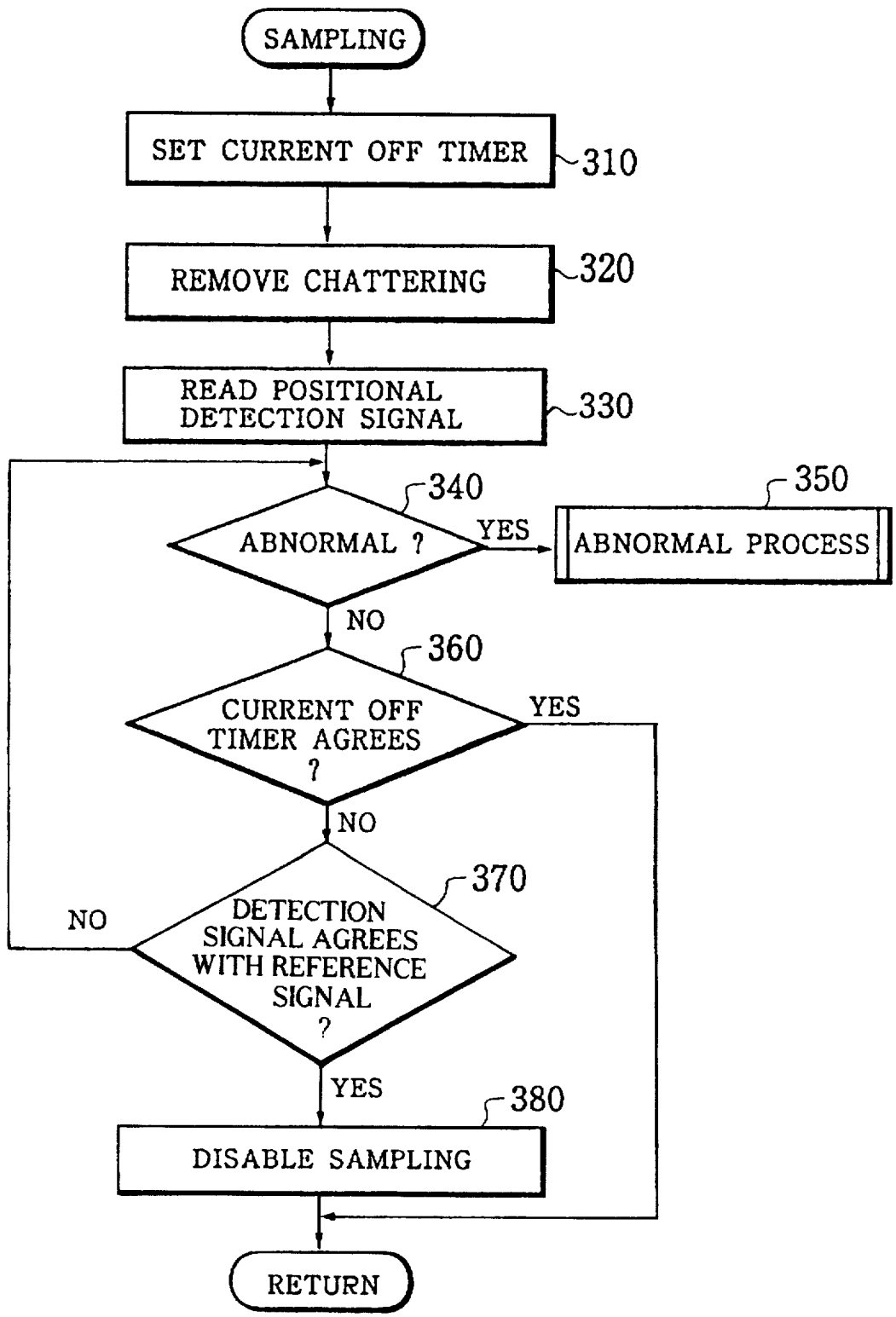
FIG. 4 is a flowchart showing a sampling step in the flow of FIG. 3.

FIG. 4 shows steps of carrying out the sampling operation.

Step 310 sets a current OFF timer. Step 320 caries out a chattering removing process. Namely, the sampling operation is suspended for about 20 microseconds after the start of the current ON interval because the output of a comparator is unstable during this period.

Step 330 reads the positional detection signal, and step 340 determines whether or not the signal is abnormal. If it is abnormal, step 350 carries out an abnormal process.

If the signal is normal, step 360 determines whether or not the current OFF timer has reached a predetermined time. If NO, step 370 determines whether or not the detected signal agrees with a predetermined signal. If NO, the flow returns to step 330, and if YES, step 380 disables the sampling operation and ends the flow.

FIG. 5 is a chart showing a comparison between microcomputer operations of the present invention and the prior art. FIG. 5(A) shows a sampling enabled period.

During the sampling enabled period, the microcomputer of the prior art of FIG. 5(D) is almost always at a sampling operation level and does not go to a main process level or a motor drive level. Accordingly, the microcomputer of the prior art is incapable of processing other processes during the sampling enabled period.

On the other hand, the microcomputer of the embodiment of the invention of FIG. 5(C) goes to the sampling process level only in response to an interrupt (from WG ON INT to WG OFF INT). Accordingly, the microcomputer of the present invention carries out other processes during the sampling enabled period except during the actual sampling interval. Namely, even during the operation of the motor, the present invention lets the microcomputer execute other processes in real time, to thereby improve the performance of the microcomputer.

Figure 6:
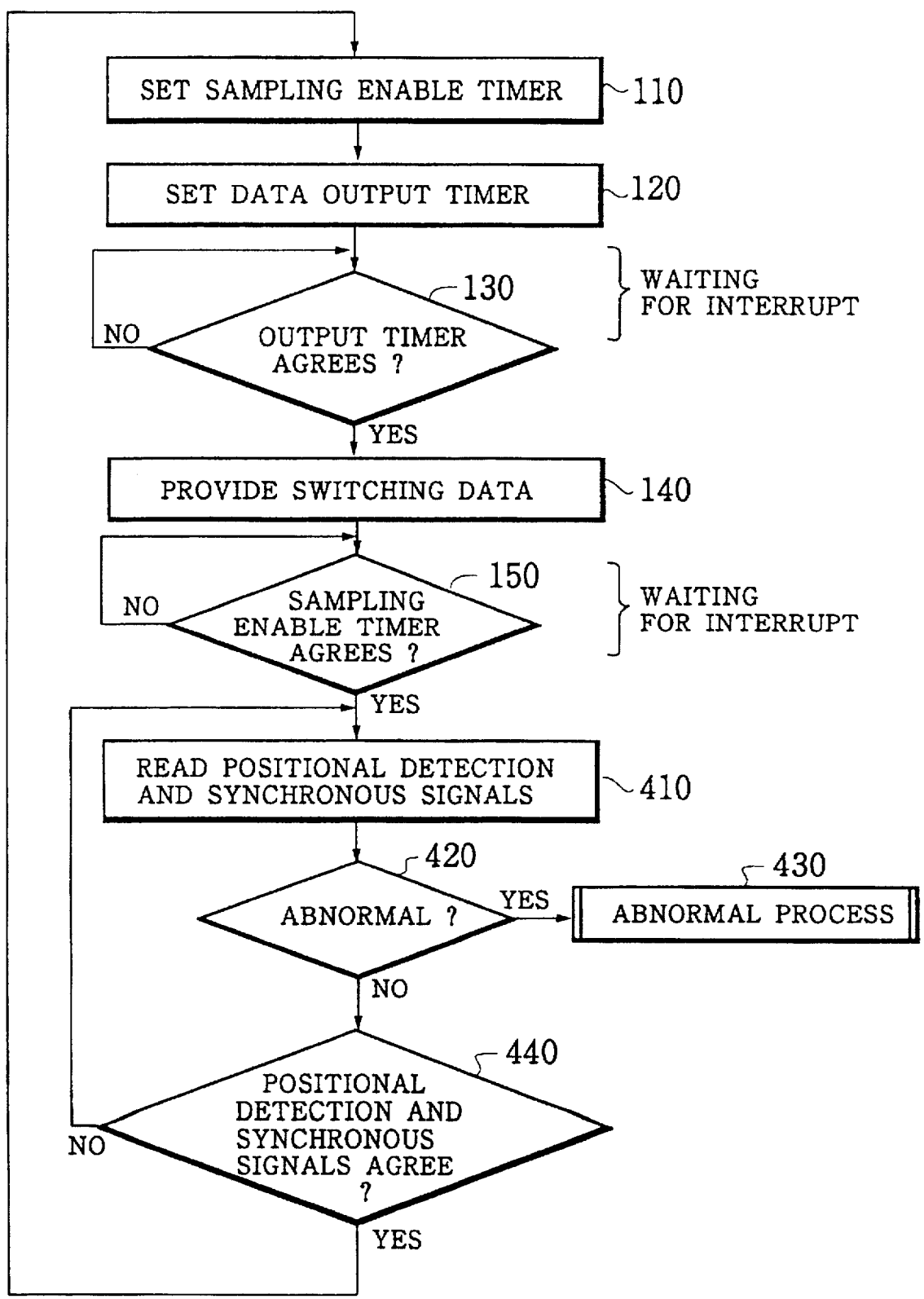
FIG. 6 is a flowchart showing operations of the prior art.

FIG. 6 is a flowchart showing steps of controlling a brushless DC motor according to the prior art. This flowchart corresponds to the flowchart of FIG. 3 of the present invention. According to the prior art, the microcomputer is dedicated to the sampling operation after step 410, so that no other processes are carried out by the microcomputer after the step 410.

On the other hand, the present invention of FIG. 3 carries out the sampling operation in response to an interrupt after step 160, and therefore, the microcomputer can execute other processes outside the interrupt interval.

In summary, a circuit for controlling a brushless DC motor according to the present invention samples a positional detection signal only during a current ON interval, so that a microcomputer of the circuit may execute processes other than a motor control process during a current OFF interval. Namely, the microcomputer executes other processes in real time while driving the motor. This results in improving the performance of the microcomputer.

Various modifications will become possible for those skilled in the art after receiving the teachings of the present disclosure without departing from the scope thereof.

What is claimed is:

1. A circuit for controlling a brushless DC motor, comprising:

a drive circuit connected to said brushless DC motor for supplying and switching power signals to said brushless DC motor in synchronism with rotation of said brushless DC motor;

a position detector connected to said brushless DC motor for detecting a current rotational position of said brushless DC motor; and a microcomputer connected to said position detector and said drive circuit for supplying said drive circuit with pulse width modulated (PWM) signals in order to control rotation of said brushless DC motor through said drive circuit in accordance with the current rotational position of said brushless DC motor detected by said position detector;

wherein said microcomputer compares the current rotational position of said brushless DC motor as detected by said position detector to a predetermined rotation position of said brushless DC motor in which said power signals should be switched, the comparing process by said microcomputer being initiated and terminated by interrupt signals utilizing a timer.

2. The circuit for controlling a brushless DC motor as claimed in claim 1, wherein said microcomputer compares the current rotational position of said brushless DC motor with the predetermined rotation position of said DC motor by comparing a voltage induced in said brushless DC motor with a reference voltage.

3. The circuit according to claim 1, wherein said microcomputer is a one-chip microcomputer.

4. A circuit for controlling a brushless DC motor, comprising:

a drive circuit connected to said brushless DC motor for supplying and switching power signals to said brushless DC motor in synchronism with rotation of said brushless DC motor;

a position detector connected to said brushless DC motor for detecting a current rotational position of said brushless DC motor by monitoring the power signals as inputted to said brushless DC motor; and a microcomputer connected to said position detector and said drive circuit for supplying said drive circuit with pulse width modulated signals in order to control rotation of said brushless DC motor through said drive circuit in accordance with a current rotational position of said brushless DC motor detected by said position detector;

wherein a sampling enable timer is preset in advance of controlling said brushless DC motor such that a first interrupt request is issued when the current rotational position of said brushless DC motor, as detected by said position detector, is to be sampled and that a second interrupt request is issued when sampling the current rotational position of said brushless DC motor, as detected by said position detector, is to be halted, wherein said microcomputer initiates and halts processing for generating pulse width modulated signals to be supplied to said drive circuit in synchronism with said first and second interrupt requests.

5. The circuit according to claim 4 wherein, when the current rotational position of said brushless DC motor is detected at an abnormal position, said microcomputer initiates an abnormal process.

6. The circuit according to claim 5, wherein the one-chip microcomputer has a waveform synthesizer for providing the PWM waveform signal.

7. The circuit according to claim 4, wherein said control means is a one-chip microcomputer.

* * * * *